Patented Sept. 22, 1936

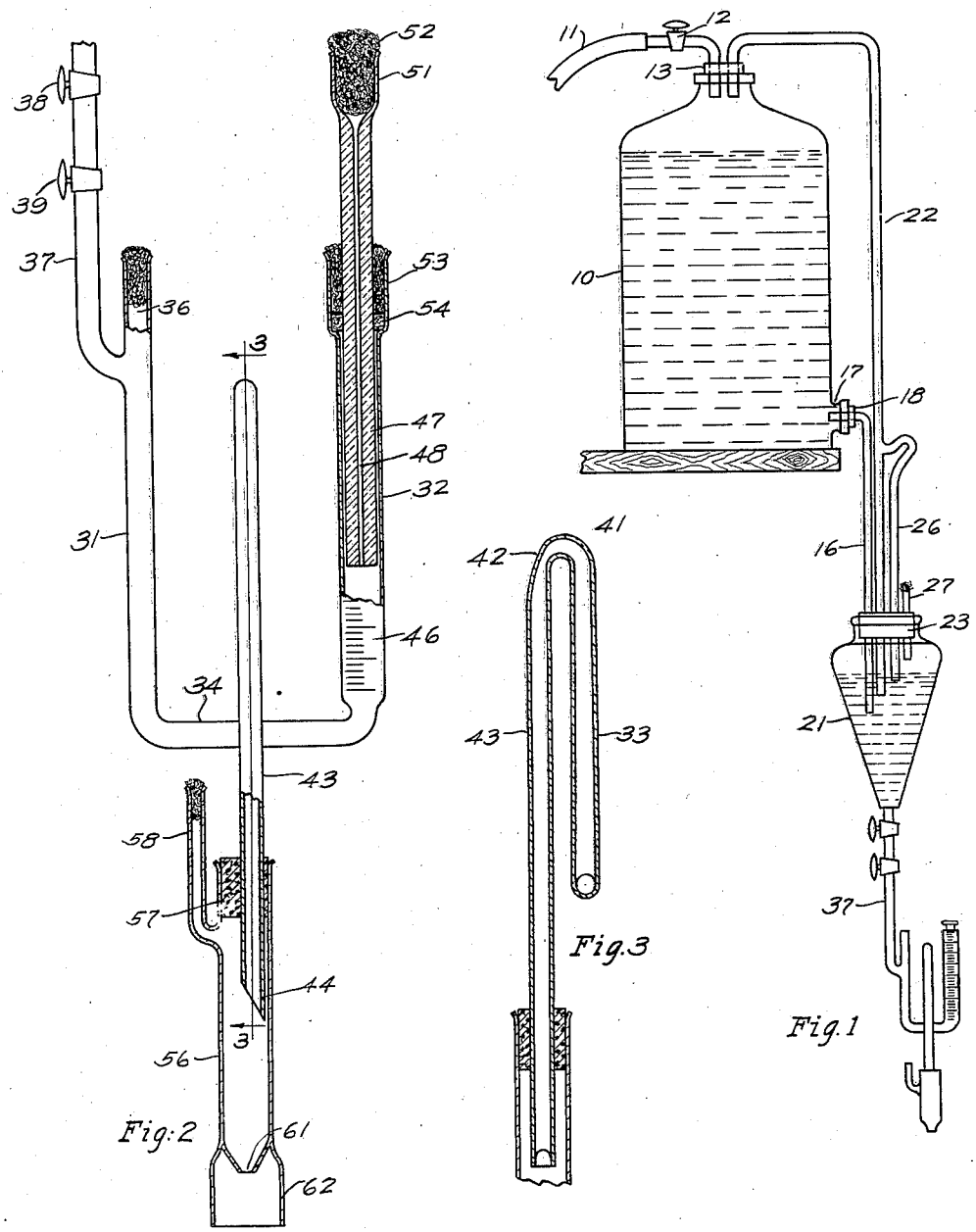

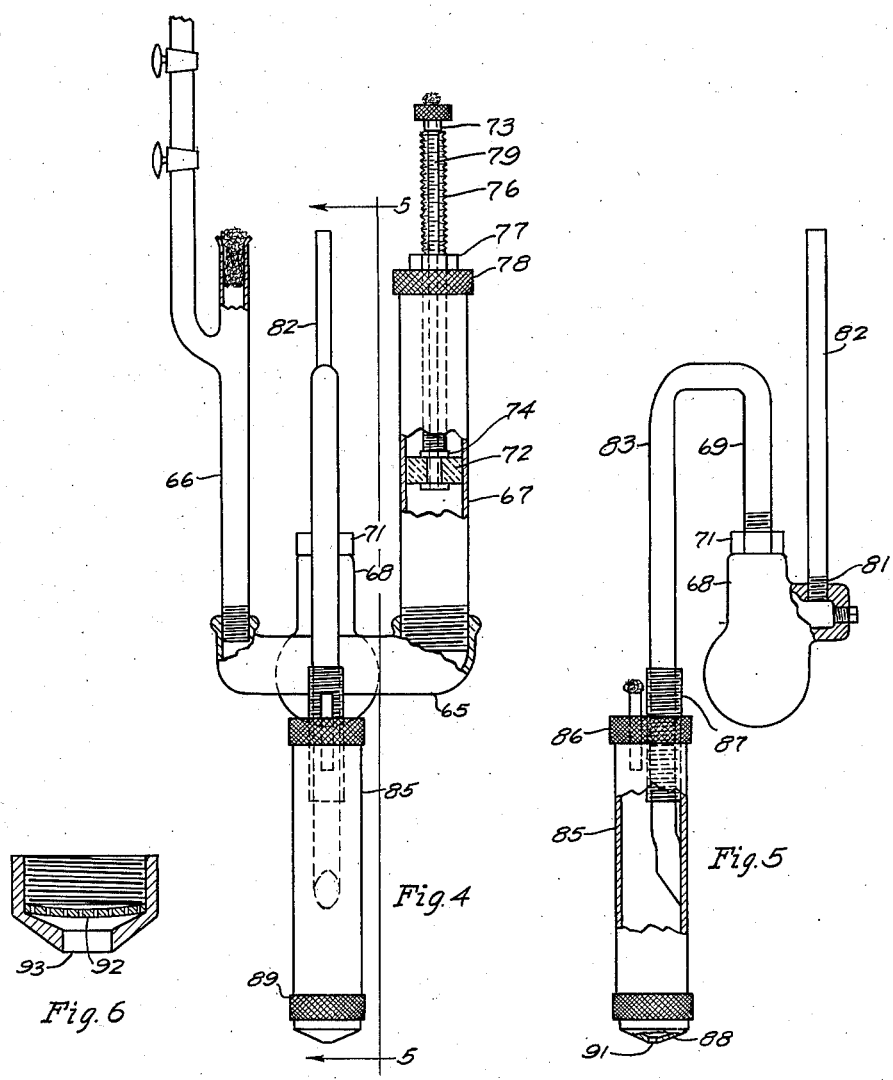

2,055,334

UNITED STATES PATENT OFFICE 2,055,334

FLUID DISPENSING APPARATUS

Henry Bukoski, East Lansing, and Merle M. Woodward, Lansing, Mich.; said Bukoski assignor to said Woodward Application July 1, 1935, Serial No. 29,292

17 Claims. (Cl. 221—101)

The present invention relates generally to fluid delivery apparatus and particularly to an apparatus for the intermittent delivery of liquids.

It is an object of the invention to provide an apparatus which will automatically and intermittently deliver a quantity of liquid.

It is another object to provide an apparatus of the above character which will deliver a predetermined quantity of liquid.

It is a further object of the invention to provide means for varying the quantity of fluid delivered by the apparatus.

Still a further object resides in the provision of a fluid supply for said apparatus which is under substantially constant pressure.

Another object is to provide an anti-drip delivery tip for the apparatus.

Another object of the invention is to provide means for maintaining a constant level of liquid supply for supplying said apparatus.

Other objects and advantages will become apparent from reading the following description taken in connection with the accompanying drawings in which:

Fig. 1 is an elevational view of the entire apparatus comprising the present invention.

Fig. 2 is an elevational view, partially in section, showing a portion of the apparatus.

Fig. 3 is a vertical sectional view taken substantially on the line 3—3 of Fig. 2.

Fig. 4 is a view similar to Fig. 2 but showing a modified form of the apparatus.

Fig. 5 is a view taken substantially on the line 5—5 of Fig. 4, and

Fig. 6 is a vertical sectional view of a modified form of delivery tip.

Referring now to the drawings, reference numeral 10 indicates a container constituting a source of liquid supply for the apparatus, having a conduit 11 leading thereto through an air tight stopper 13 from any suitable source and which may be provided with a suitable control valve 12 therein. The supply container 10 is provided with an outlet 17 near the bottom thereof which may be connected by a downwardly extending tube 16 through a suitable air tight stopper 18, with the interior of a container 21 through a stopper 23, provided for directly supplying the apparatus with the liquid to be dispensed. Another tube 22 extends upwardly, through the stopper 23, from the container 21 in parallel relation to the tube 16 to provide communication with the main supply container 10 through the inlet opening thereof. A third tube, or side-arm 26, also extends upwardly from the container 21 and joins the tube 22 at a point slightly below the plane of the outlet 17 of the supply container 10. An air vent tube 27 also extends through the stopper 23 to provide atmospheric communication with the interior of the container 21. It will be noted that each of the tubes 16, 22 and 26 terminate in slightly different planes within the container 21.

The operation of the portion of the apparatus thus far described is as follows:

The liquid in container 10 will normally tend to flow from outlet 17 and through the downwardly extending tube 16 to the interior of container 21. As this container fills and the liquid rises therein, a portion thereof will fill tube 22 up to the level of the fluid within the container 10. As the fluid continues to rise within container 21, the side-arm 26 will also be filled. When the level of liquid within the container 21 reaches the lower end of the side-arm 26, this tube as well as tubes 16 and 22 are sealed against atmospheric pressure and a vacuum is produced within the top of the supply container 10 and the unfilled portion of tube 22 simultaneously with any further downward movement of the liquid in the container.

As the liquid is drawn out of the container 21 by the apparatus to be presently described, the seal on the end of side-arm 26 is broken and atmospheric pressure is applied to the column of liquid therein forcing it upwardly and forcing that portion of the column of liquid in tube 22 below the junction with side-arm 26 downwardly into the container 21. This movement of the liquid, which is instantaneous, continues until the contents of the side-arm and the lower portion of tube 22 are emptied into the container 21. The column of liquid in tube 22 above the junction with tube 26 will be induced upwardly into container 10 due to the vacuum therein. It will be apparent that at this point the vacuum in the top of container 10 will be broken inasmuch as there is communication with the atmosphere through side-arm 26 and air vent 27. As soon as the vacuum is broken the fluid will flow from the outlet 17 into container 21 and the operation above described will be repeated. Thus, a substantially constant level of liquid supply is maintained for the apparatus.

Referring now to Figs. 2 and 3, reference numerals 31, 32 and 33 indicate parallel upwardly extending containers in the form of tubes, the lower ends of which may be joined by a transverse connecting tube 34. Tube 31 is provided at its upper end with an air vent opening 36, the open end of which may be filled with cotton or other air cleaning material. An upwardly extending liquid supply tube 37 joins tube 31 near the upper end thereof and may be provided with suitable valves 38 and 39, one for regulating the rate of flow of the liquid through tube 37 and the other for completely cutting off the flow of liquid when desired.

It will be noted that tube 33 is provided with a curved portion at the upper end thereof having a restricted portion 42 to which is joined a downwardly extending portion 43 terminating in an angularly cut end 44 at a point below the plane of the transverse tube 34.

It is desirable that means be provided for predetermining and varying the output of the apparatus. To this end, the vertical tube 32 is marked with suitable indicia as at 46 and is provided interiorly thereof with a reciprocal plunger 47 having an axially extending air vent passageway 48 therethrough and terminating in a cup 51 which may also be filled with suitable air cleaning material 52, thus providing a calibrating tube for measuring and varying the output capacity of the apparatus.

The calibrating tube 32 may conveniently terminate in a cup-shaped upper end 53 having a gasket 54 formed of felt or other suitable material through which the plunger 47 extends.

A suitable nozzle 56 having an air vent tube 58 and a delivery tip 61 provided with a shield 62 to receive a laboratory test tube or other container, may be secured to the end of the delivery tube 43 by a tight fitting cork 57 which may be formed of rubber or other suitable material. It may be here noted that the angular end 44 of the delivery tube 43 extends along one wall of the nozzle 56 in contiguous relation thereto. This provision insures a "clean break" when the apparatus intermittently ceases to deliver liquid, and tends to prevent dripping.

In operation, the liquid enters the apparatus through tube 37 at a suitable rate of flow regulated by one of the valves 39 and flows downwardly through tube 31, through the transverse tube 34, and fills the calibrating tube 32 up to the lower end of the plunger 47 and simultaneously fills the tubes 33 and 31 as well as a portion of the air vent 48. As the liquid level reaches the curved neck portion 41 of the tube 33 it adheres to the sides of the tube in passing through the restricted neck portion 42 forming a solid liquid column. As soon as this column of liquid extends downwardly sufficiently in tube 43, a siphon action takes place and the entire contents of tubes 31, 32, 33 and 34 are siphoned through tube 43 into the nozzle 47 and delivered through the tip 61 into the receiving container.

The tubes 31, 32, 33 and 34 again fill with liquid from the supply tube 37 and the operation above described is repeated.

It will thus be seen that a complete device is provided for the intermittent delivery of a predetermined measured quantity of liquid. The level of the fluid in container 21 is substantially maintained at all times, with the result that the liquid passes therefrom through supply tube 32 under substantially constant pressure and flows into the apparatus at a constant, predetermined rate of flow and the apparatus is filled and emptied intermittently and automatically.

It may be desirable in some instances to form the apparatus of metal such as copper, brass or the like. With this in view, Figs. 4 and 5 show a modified form of the apparatus constructed of such material. Reference numeral 65 indicates a hollow casting having an upwardly extending outlet at either end thereof, into which the tube 66 and the calibrating tube 67 are threaded or otherwise suitably secured, and an upwardly extending outlet 68 in which the siphon tube 69 may be removably secured as by a threaded collar 71. The calibrating plunger may be in the form of a piston 72 of suitable material secured to a piston rod 73 as at 74, the sides of which may be square as shown or may be three quarters round with one flat side and threaded as at 76 to receive a nut 77 which in turn may rest upon a collar 78 enclosing the upper end of the calibrating tube 67. It will be seen from this construction that the piston 72 may be moved vertically by rotation of the collar 77. The calibrations in this instance may be provided on the faces of the piston rod 73 which extend above the tube 67, as at 79.

In some instances it may be desirable to reduce the output volume of the apparatus to an amount less than would normally be delivered were the piston positioned in its lowermost position. This may be accomplished by the provision of an opening 81 adjacent the top of the casting 65 into which there may be threaded a tube 82, open at its upper end and extending to a point above the upper ends of the siphon tube 69 and the delivery tube 83. When it is desired to thus reduce the output of the apparatus, tube 82 may be screwed into opening 81 providing an air vent adjacent the top of the casting 65 so that when the apparatus automatically siphons, the liquid will be drawn out only to the plane of the air vent. At this point, of course, the vacuum will be broken. When it is desired to employ the apparatus to deliver liquid at its normal capacity, the tube 82 is removed and the vent 81 closed by a suitable cap (not shown).

As shown in Figs. 4 and 5 the nozzle 85 may be provided with a collar 86 having a threaded portion to engage threads formed on a sleeve 87 positioned on the lower end of delivery tube 83. In this manner the nozzle may be entirely removed or may be raised or lowered to vary the distance between the end of tube 83 and the tip 88 which is also removably threaded to the nozzle 85 as at 89 and provided with an outlet opening 91 somewhat smaller than the diameter of the tube 83. It will thus be seen that tips having different sized outlet openings may be employed at will. It will be observed from Figs. 5 and 6 that the angle of the walls of the tip adjacent the outlet opening is relatively flat to reduce the possibility of dripping after the siphoning action has taken place. In this manner the surface tension of the metal is sufficient to hold the last drop or two of fluid that would otherwise drip out.

In Fig. 5 it will be seen that the lower end of tube 83 is bent to lie in contiguous relation to the wall of the nozzle 85.

A modified form of tip is shown in Fig. 6 comprising a slightly concave metal disk having several small perforations 92 therethrough which may be employed where a relatively large delivery opening 93 is desired. The material surrounding the several perforations provide the necessary surface tension to prevent dripping of the liquid which would normally occur in connection with the relatively large opening 93.

It will be understood that the specific construction of the apparatus and arrangement of parts may be varied to suit a particular need without departing from the spirit or scope of the invention which is to be limited only by the appended claims. For example, the principle of the device herein disclosed may be employed for numerous commercial uses such as the filling of bottles with milk or fluid extracts or in filling small phials such as are sold in large quantities by the drug and chemical companies.

The invention may also find utility in numerous other commercial installations, the exact nature of which we are not at present aware.

What is claimed and desired to be secured by Letters Patent is:

1. In an intermittent fluid delivery apparatus, a source of fluid under pressure, a plurality of vertically extending fluid container tubes, means providing fluid communication between said fluid source and the interior of one of said tubes, a transverse tube connecting the interiors of said vertical tubes adjacent their lower ends, a depending outlet tube connected to one of said vertical tubes adjacent the upper end thereof, and means associated with one of said tubes for varying the volume of fluid delivered by said apparatus.

2. In an intermittent fluid delivery apparatus, a pair of parallel vertically extending fluid container tubes one of which is open to atmospheric pressure, means connecting the interiors of said tubes at their lower extremities, means for supplying a constant flow of fluid to one of said tubes, and a siphon delivery tube connected to one of said vertically extending tubes at a point above said connecting means.

3. An intermittent fluid delivery apparatus comprising a pair of vertically extending fluid container tubes, one of said tubes being longer and extending downwardly further than the other, a curved neck portion connecting the upper extremities of said tubes, a fluid supply container having an outlet positioned above the upper extremities of said tubes, and means providing a constant flow of fluid from said outlet to the open end of the other of said tubes.

4. An intermittent fluid delivery apparatus comprising a pair of vertically extending fluid container tubes, one of said tubes being longer and extending downwardly further than the other, a curved neck portion connecting the upper extremities of said tubes, and a fluid supply container having an outlet positioned above the upper extremities of said tubes, means providing a constant flow of fluid from said outlet to the open end of the other of said tubes, and means restricting the fluid flow from said supply container to less than the outlet capacity of the longer of said tubes.

5. In an intermittent fluid delivery apparatus, a source of fluid supply, an upwardly extending tube in communication with said source of supply, a downwardly extending tube connected to said upwardly extending tube at the upper end thereof, and means providing a constant restricted flow of fluid to said upwardly extending tube.

6. In an intermittent fluid delivery apparatus, a source of fluid, a plurality of spaced upwardly extending fluid container tubes one of which is open at its upper end to atmospheric pressure, a fluid supply tube communicating with one of said fluid container tubes, a transversely extending tube connecting the lower ends of said upwardly extending tubes, a reciprocal plunger in one of said upwardly extending tubes for varying the output of said apparatus, and a downwardly extending outlet tube connected to the upper end of another one of said upwardly extending tubes.

7. In an intermittent fluid delivery apparatus, a source of fluid, a pair of spaced vertically extending fluid container tubes open at their upper ends to atmospheric pressure, a fluid supply tube communicating with one of said vertically extending tubes, a reciprocal plunger in one of said tubes for varying the output of said apparatus, a transverse tube connecting said vertically extending tubes at their lower ends, another vertically extending tube connected to said transverse tube and having a curved neck portion and a downwardly extending outlet terminating at a point below the plane of said transverse tube, and a discharge nozzle open to atmospheric pressure and enclosing the outlet of said downwardly extending tube portion.

8. In an intermittent fluid dispensing apparatus, a hollow casing having a plurality of spaced upwardly extending openings, a filler tube threaded in one of said openings, a siphon delivery tube threaded in another of said openings, and a calibrating tube threaded in another of said openings, a reciprocal piston in said calibrating tube having a threaded portion and extending exteriorly of said tube through the upper end thereof, and a rotatable collar engaging said threads and the top of said tube for adjustably positioning said piston in said tube to vary the output of said apparatus.

9. In an intermittent fluid delivery apparatus, a transverse chamber, a fluid supply tube leading into said chamber, a siphon delivery tube leading fom said chamber comprising an upwardly extending portion and a downwardly extending portion, an air vent in said casing adjacent the upper side thereof, and a tube extending upwardly from said air vent and terminating above the upper extremity of said siphon tube.

10. In a fluid dispensing apparatus having a fluid supply tube and a delivery nozzle, a fluid delivery tube in communication with said fluid supply tube and terminating in an angularly formed tip, said delivery tube extending within said nozzle in contiguous relation to one wall thereof.

11. In an intermittent fluid delivery apparatus, a fluid supply container, an automatically operable siphon, an intermediate container between said supply container and said siphon, a tube providing communication between the lower end of said supply container and the interior of said intermediate container, another tube connecting the upper interior of said supply container with the interior of said intermediate container, and a side arm tube connecting the interior of said intermediate container with said second tube at a point intermediate its ends.

12. In a fluid dispensing apparatus, a fluid delivery tube having an outlet opening, a fluid delivery nozzle communicating with said delivery tube, and a delivery tip communicating with said nozzle and having an outlet opening therein larger than the outlet opening of said delivery tube, and a partition having a plurality of openings therethrough positioned within said nozzle between the outlet of said delivery tube and the outlet of said delivery tip.

13. In a fluid dispensing apparatus, a fluid delivery tube, a fluid delivery nozzle communicating with said delivery tube, and a delivery tip associated with said nozzle having an end wall provided with an opening therethrough, the portion of said end wall surrounding said opening being downwardly inclined only slightly from a horizontal plane toward said opening.

14. In a fluid dispensing apparatus, a fluid supply container having inlet and outlet openings, a siphon apparatus, a fluid container positioned intermediate said supply container and said siphon apparatus, means connecting the outlet of said supply container with the interior of said intermediate container, means connecting the inlet opening of said supply container with the interior of said intermediate container, and means connecting the interior of said intermediate container with said second means.

15. In a fluid dispensing apparatus, a fluid delivery tube, a fluid delivery nozzle communicating with said delivery tube, and a delivery tip communicating with said nozzle and having an outlet opening therein, and a partition having a plurality of openings therethrough positioned within said nozzle between said delivery tube and said outlet opening.

16. An intermittent fluid delivery apparatus comprising a pair of vertically extending fluid container tubes, one of said tubes being longer and extending downwardly further than the other, a curved neck portion connecting the upper extremities of said tubes, a fluid supply container having an outlet positioned above the upper extremities of said tubes, means providing a constant flow of fluid from said outlet to the lower end of the other of said tubes, means restricting the fluid flow from said supply container to less than the outlet capacity of the longer of said tubes, and means for varying the output volume of said apparatus.

17. An intermittent fluid delivery apparatus comprising a pair of vertically extending fluid container tubes, one of said tubes being longer and extending downwardly further than the other, a curved neck portion connecting the upper extremities of said tubes, a fluid supply container having an outlet positioned above the upper extremities of said tubes, means providing a constant flow of fluid from said outlet to the open end of the other of said tubes, means for varying the flow of fluid from said supply container, and means for varying the output volume of said apparatus.

HENRY BUKOSKI.
MERLE M. WOODWARD.